US011953353B2

(12) United States Patent
Wallmeyer et al.

(10) Patent No.: US 11,953,353 B2
(45) Date of Patent: Apr. 9, 2024

(54) ANGULAR CIRCUIT BOARD ASSEMBLY FOR A FLOWMETER

(71) Applicant: Honeywell International Inc., Morris Plains, NJ (US)

(72) Inventors: August Wallmeyer, Recke (DE); Claas Gerdes, Tecklenburg (DE)

(73) Assignee: Honeywell International Inc., Charlotte, NC (US)

( * ) Notice: Subject to any disclaimer, the term of this patent is extended or adjusted under 35 U.S.C. 154(b) by 257 days.

(21) Appl. No.: 17/156,542

(22) Filed: Jan. 23, 2021

(65) Prior Publication Data
US 2022/0163358 A1 May 26, 2022

Related U.S. Application Data

(60) Provisional application No. 63/117,459, filed on Nov. 24, 2020.

(51) Int. Cl.
G01F 1/075 (2006.01)
G01F 1/7086 (2022.01)
G01N 21/85 (2006.01)

(52) U.S. Cl.
CPC ............ *G01F 1/075* (2013.01); *G01F 1/7086* (2013.01); *G01N 21/85* (2013.01)

(58) Field of Classification Search
CPC ........ G01F 1/075; G01F 1/7086; G01F 1/065; G01F 1/053; G01N 21/85
See application file for complete search history.

(56) References Cited

U.S. PATENT DOCUMENTS

| 4,393,724 A * | 7/1983 | Werkmann ................ G01F 1/10 73/861.89 |
| 10,564,016 B2 | 2/2020 | Sai et al. |
| 10,627,273 B2 | 4/2020 | Deng et al. |
| 10,641,641 B2 | 5/2020 | Ploss et al. |
| 2005/0204829 A1 * | 9/2005 | Cohen ................... G01F 15/005 73/861.53 |

(Continued)

OTHER PUBLICATIONS

"Honeywell: Ultrasonic Metering Solutions", Honeywell The Power of Connected | Connected Industrial, 2017, Honeywell International Inc.

(Continued)

Primary Examiner — Peter J Macchiarolo
Assistant Examiner — John M Royston
(74) Attorney, Agent, or Firm — Ortiz & Lopez, PLLC; Luis M. Ortiz; Kermit D. Lopez

(57) ABSTRACT

A sensor apparatus and a method of operating the sensor apparatus can include one or more sensors and a circuit board, wherein the one or more sensors can include a rotatable component (e.g., pulse disk, crank, pin, shaft, etc), and an angular circuit board assembly that maintains the circuit board in an angular position with respect to the rotatable component in an arrangement that allows the rotatable component to dive through the circuit board. The sensor can be, for example, a magnetic sensor, a light emitting diode or a photo diode. The sensor apparatus can include a flow channel and the rotatable component can oscillate to provide a measurement of a flow of fluid through the flow channel. The sensor apparatus can be used for the mechanical/electrical detection of pulses of a rotary motion.

17 Claims, 4 Drawing Sheets

(56) References Cited

U.S. PATENT DOCUMENTS

| | | | |
|---|---|---|---|
| 2010/0307613 A1 | 12/2010 | Temme et al. | |
| 2012/0038143 A1* | 2/2012 | Shih | G01F 15/005 |
| | | | 285/31 |
| 2018/0259378 A1* | 9/2018 | Yao | G01D 11/245 |
| 2020/0105166 A1 | 4/2020 | Pries et al. | |
| 2020/0355527 A1* | 11/2020 | Scilingo | G01F 1/10 |

OTHER PUBLICATIONS

"USM GT400 Ultrasonic Flowmeter Proven Technology. Superior Performance." Honeywell, LincEnergySystems.com (Downloaded May 14, 2020).

\* cited by examiner

ANGULAR CIRCUIT BOARD ASSEMBLY FOR A FLOWMETER

CROSS-REFERENCE TO PROVISIONAL APPLICATION

This patent application claims priority under 35 U.S.C. § 119(e) to U.S. Provisional Patent Application Ser. No. 63/117,459 entitled "Angular Circuit Board Assembly For A Flowmeter," which was filed on Nov. 24, 2020, the disclosure of which is incorporated herein by reference in its entirety.

TECHNICAL FIELD

Embodiments relate to the mechanical/electrical detection of pulses of a rotary motion. Embodiments further relate to flow sensors including fluid flowmeters such as gas meters. In addition, embodiments relate to printed circuit boards and sensors including optical sensors and magnetic sensors utilized in fluid flowmeters.

BACKGROUND

Flowmeters such as bellow gas meters, flow-measuring devices are widely applied in process and automation technology and in commercial and residential gas metering applications. These devices can permit simple determination of volume flow and/or mass flow in a flow channel such as a pipe.

A challenge in the design and implementation of such flowmeters is the need to save costs by using increasingly inexpensive components and saving component space.

BRIEF SUMMARY

The following summary is provided to facilitate an understanding of some of the features of the disclosed embodiments and is not intended to be a full description. A full appreciation of the various aspects of the embodiments disclosed herein can be gained by taking the specification, claims, drawings, and abstract as a whole.

It is, therefore, one aspect of the embodiments to provide for the mechanical/electrical detection of pulses of a rotary motion.

It is a further aspect of the embodiments to provide for an improved flowmeter that uses sensor components for the detection of mechanically inducted signals.

It is also an aspect of the embodiments to provide for a flowmeter operable with an angular circuit board assembly.

The aforementioned aspects and other objectives can now be achieved as described herein. In an embodiment, a sensor apparatus can include at least one sensor and a printed circuit board, wherein the at least one sensor is associated with a rotatable component (e.g., pulse disk, crank, pin, shaft, etc.) and detects pulses of a rotary motion. The angular circuit board assembly can maintain the printed circuit board in an angular position with respect to the rotatable component associated with the at least one sensor in an arrangement that allows the rotatable component to dive through the printed circuit board and facilitate detection of the pulses of the rotatable component by the at least one sensor.

In an embodiment of the sensor apparatus, the at least one sensor can comprise an optical sensor that detects mechanically inducted signals.

In an embodiment of the sensor apparatus, the at least one sensor can comprise at least one of: a light emitting diode, a photo diode and a light barrier.

In an embodiment of the sensor apparatus, the at least one sensor can comprise a magnetic sensor that detects mechanically inducted signals.

In an embodiment of the sensor apparatus, the at least one sensor can include a flow channel and the rotatable component can oscillate to provide a measurement of a flow of fluid through the flow channel.

In another embodiment, a flow meter apparatus can include a flowmeter comprising at least one sensor and a circuit board, wherein the at least one sensor is associated with a rotatable component, and an angular circuit board assembly can maintains the circuit board in an angular position with respect to the rotatable component associated with the at least one sensor in an arrangement in which the rotatable component can dive through the circuit board.

In an embodiment of the flowmeter apparatus, the circuit board can comprise a printed circuit board.

In an embodiment of the flowmeter apparatus, the at least one sensor can comprise an optical sensor that detects mechanically inducted signals.

In an embodiment of the flowmeter apparatus, the sensor can comprise at least one of: a light emitting diode, a photo diode and a light barrier.

In an embodiment of the flowmeter apparatus, the at least one sensor can comprise a magnetic sensor that detects mechanically inducted signals.

In an embodiment of the flowmeter apparatus, the flowmeter can include a flow channel and wherein the rotatable component can oscillate to provide a measurement of a flow of fluid through the flow channel.

In another embodiment, a method of operating a sensor apparatus, can involve: detecting pulses or a rotary motion with at least one sensor and a printed circuit board, wherein the at least one sensor is associated with a rotatable component and the printed circuit board can be maintained by an angular circuit board assembly in an angular position with respect to the rotatable component associated with the at least one sensor in an arrangement in which the rotatable component can dive through the printed circuit board and facilitate the detecting of the pulses of the rotary motion by the at least one sensor.

BRIEF DESCRIPTION OF THE DRAWINGS

The accompanying figures, in which like reference numerals refer to identical or functionally-similar elements throughout the separate views and which are incorporated in and form a part of the specification, further illustrate the present invention and, together with the detailed description of the invention, serve to explain the principles of the present invention.

DETAILED DESCRIPTION

Figure 1:
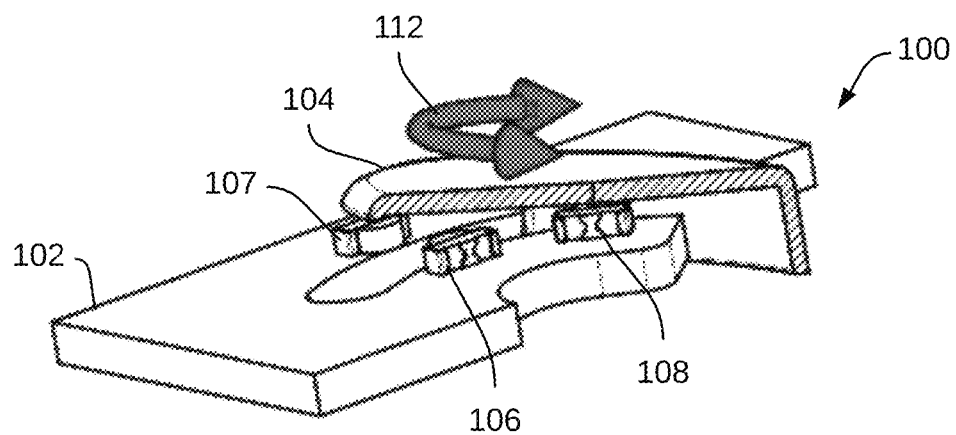
FIG. 1 illustrates a partial cut-away view of a portion of a flowmeter, in accordance with an embodiment.

The particular values and configurations discussed in these non-limiting examples can be varied and are cited merely to illustrate one or more embodiments and are not intended to limit the scope thereof.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other issues, subject matter may be embodied as methods, devices, components, or systems. Accordingly, embodiments may, for example, take the form of hardware, software, firmware, or a combination thereof. The following detailed description is, therefore, not intended to be interpreted in a limiting sense.

Throughout the specification and claims, terms may have nuanced meanings suggested or implied in context beyond an explicitly stated meaning. Likewise, phrases such as "in one embodiment" or "in an example embodiment" and variations thereof as utilized herein may not necessarily refer to the same embodiment and the phrase "in another embodiment" or "in another example embodiment" and variations thereof as utilized herein may or may not necessarily refer to a different embodiment. It is intended, for example, that claimed subject matter include combinations of example embodiments in whole or in part.

In general, terminology may be understood, at least in part, from usage in context. For example, terms such as "and," "or," or "and/or" as used herein may include a variety of meanings that may depend, at least in part, upon the context in which such terms are used. Generally, "or" if used to associate a list, such as A, B, or C, is intended to mean A, B, and C, here used in the inclusive sense, as well as A, B, or C, here used in the exclusive sense. In addition, the term "one or more" as used herein, depending at least in part upon context, may be used to describe any feature, structure, or characteristic in a singular sense or may be used to describe combinations of features, structures, or characteristics in a plural sense. Similarly, terms such as "a," "an," or "the", again, may be understood to convey a singular usage or to convey a plural usage, depending at least in part upon context. In addition, the term "based on" may be understood as not necessarily intended to convey an exclusive set of factors and may, instead, allow for existence of additional factors not necessarily expressly described, again, depending at least in part on context.

The disclosed embodiments can be implemented in the context of a sensor apparatus such as a flowmeter that can measure the flow (e.g., fluid velocity) of a fluid (e.g., a gas or a liquid). An example of a type of flowmeter in which the embodiments can be implemented is a bellows gas meter (also referred to as a 'bellows-type gas meter' or 'bellows-type meter'), which is a flowmeter that can measure a total volume of a continuous gas flow stream in which the motion of two bellows, alternately filled with and exhausted of the gas, actuates a register. It can be appreciated that the disclosed embodiments are not limited to implementation within or in associate with bellows gas meters, but can be implemented in the context of other types of flowmeters or flow sensors. Reference to a 'bellows gas meter' is provided herein for illustrative purposes only.

FIG. 1 illustrates a partial cut-away view of a portion of a sensor apparatus 100, in accordance with an embodiment. The sensor apparatus 100 can be used for the mechanical/electrical detection of pulses of a rotary motion. In some embodiments, the sensor apparatus 100 may be implemented as a flowmeter for use in gas measurement. It should be appreciated, however, that the sensor apparatus 100 is not limited for use as a gas measurement device or sensor, but can be used for a variety of applications involving the mechanical/electrical detection of pulses of a rotary motion.

The sensor apparatus 100 can include a pulse disk 104 with respect to one or more sensors including a sensor 106, a sensor 107, and a sensor 108. Note that in the embodiment of FIG. 1, a pulse disk 104 is shown, which is an example of a rotatable component. It can be appreciated that in other embodiments, other types of rotatable components may be used, such as, for example, a crank, a pin, a shaft, and so on. In other words, although the embodiments disclosed herein discuss and illustrate the pulse disk 104 as an example of a rotatable component, other types of rotatable components may be implemented in other embodiments. The embodiments are not limited to the use of a rotatable component such as the pulse disk 104, but can be implemented with other types of rotatable components in place of or in addition to or in place of the pulse disk 104.

Figure 5:
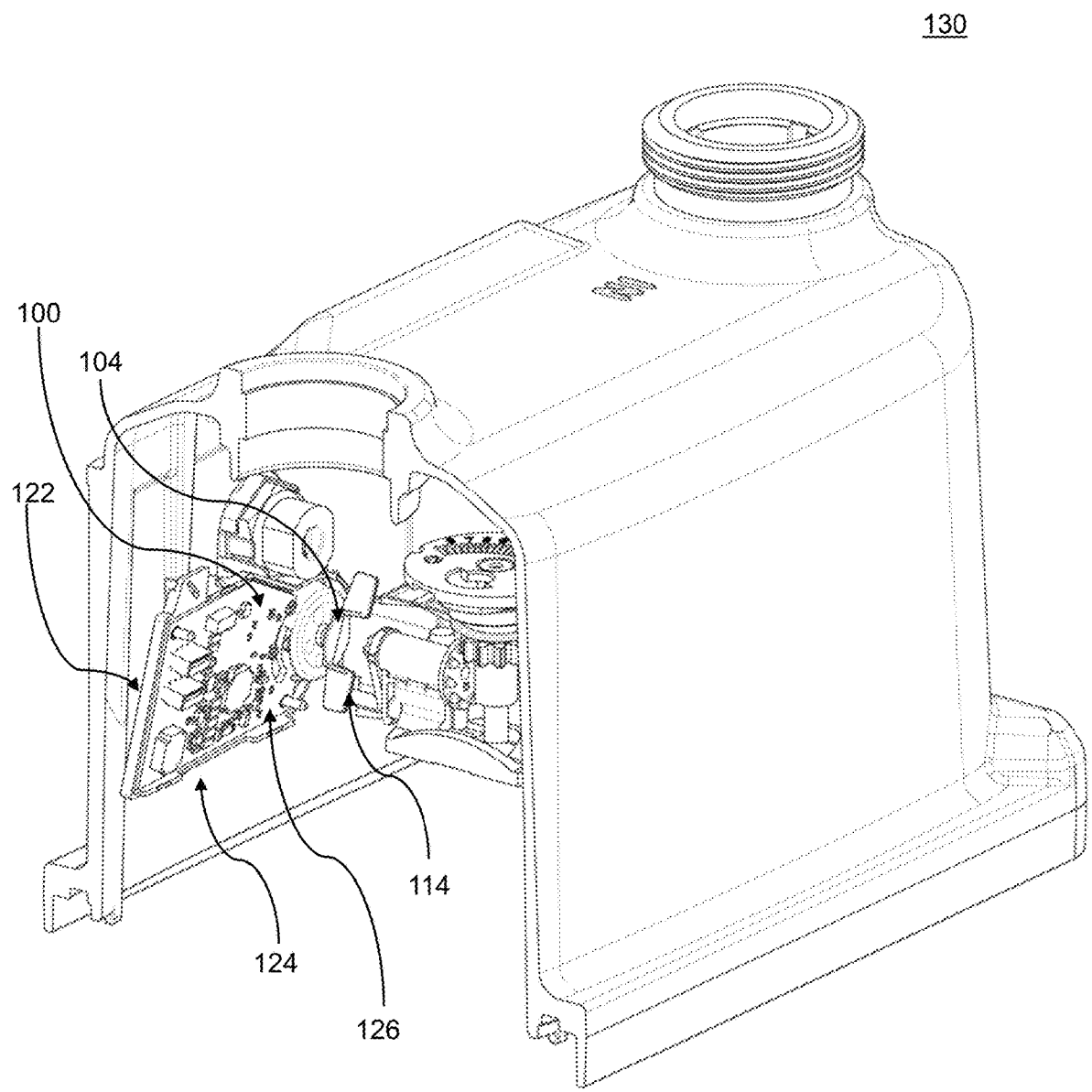
FIG. 5 illustrates a cut-away portion of a flowmeter apparatus in an angular arrangement in which the pulse disk can dive through the circuit board, in accordance with an embodiment.

An arrow 112 shown in FIG. 1 generally indicates the direction of rotation of the pulse disk 104. Note that in the figures illustrated and discussed herein, identical or similar parts are generally indicated by identical reference numerals. The pulse disk 104 is shown in FIG. 1 with respect to a circuit board platform 102, which can form part of a circuit board such as a PCB (Printed Circuit Board). The circuit board platform 102 may be configured from the circuit board or may be attached as a component to the circuit board. An example of a circuit board is shown in FIG. 5 as circuit board 126.

The sensor apparatus 100 depicted in FIG. 1 can be implemented in angular assembly that allows the pulse disk 104, which can also be referred to as a "pulse wheel," to dive through the circuit board 126. The pulse disk 104 can rotate or oscillate to provide a pulse when passing either a magnetic sensor and/or an optical sensor. Without allowing the pulse disk to "dive" through the circuit board 126, inexpensive sensor components (e.g., LED/photodiodes, etc) would not be able to be used for the sensor apparatus 100. By "dipping" the pulse disk 104 in the manner discussed herein, it is possible to use low cost sensor components). For a comparable function without tilting and immersion of the pulse disk 104 through the circuit board, much more expensive and larger components would have to be used (as will be shown in the arrangement in FIG. 3).

Figure 2:
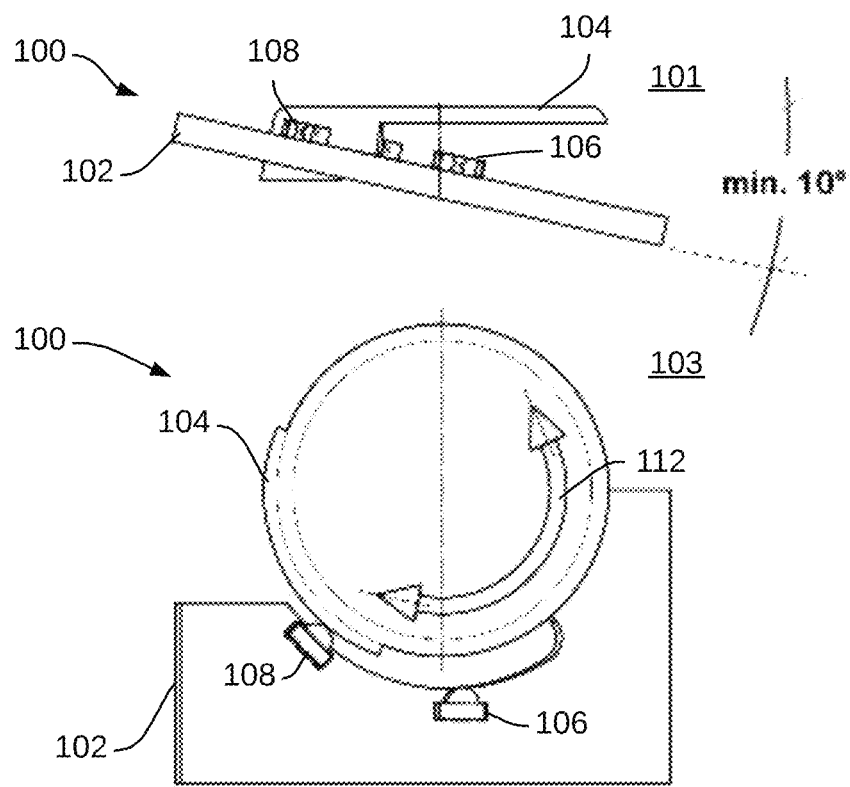
FIG. 2 illustrates a top view and a side view of a flowmeter, in accordance with an embodiment.

FIG. 2 illustrates a top view 101 and a side view 103 of the sensor apparatus 100 depicted in FIG. 1, in accordance with an embodiment. As shown in the top view 101, the sensor apparatus 100 (e.g., a flowmeter) can include the sensors 106, 108, etc. with the pulse disk 104 and circuit board 126 and the circuit board portion 102 in an angular circuit board assembly (e.g., see the angular circuit board assembly 124 shown in FIG. 5) that can maintain the circuit board 126 in an angular position with respect to the pulse disk 104 in an arrangement that allows the pulse disk 104 to dive through the circuit board (e.g., see the circuit board 126 in FIG. 5).

Figure 3:
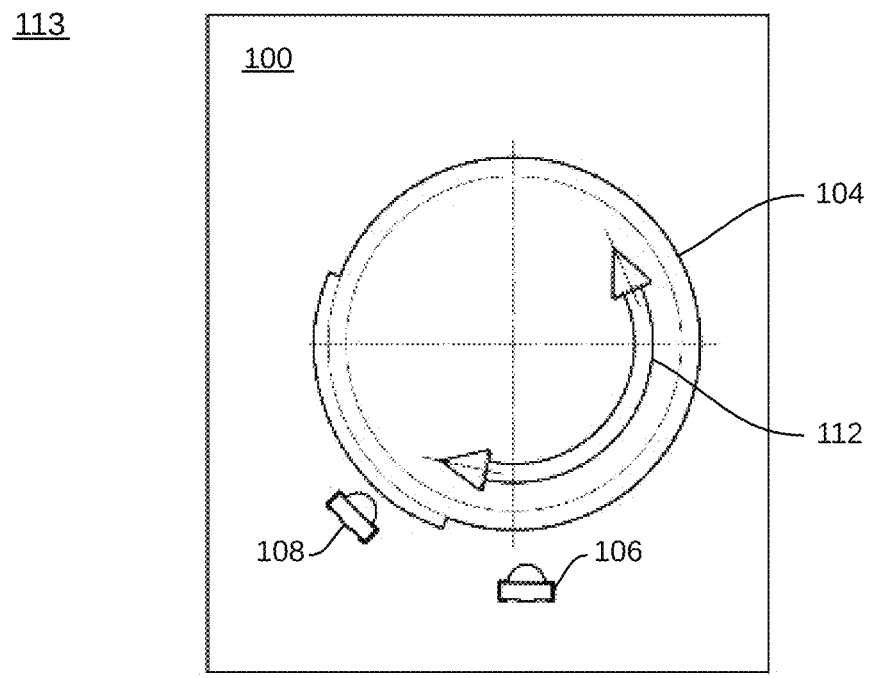
FIG. 3 illustrates a top view of and a side view of a flowmeter without tilting.
Figure 3:
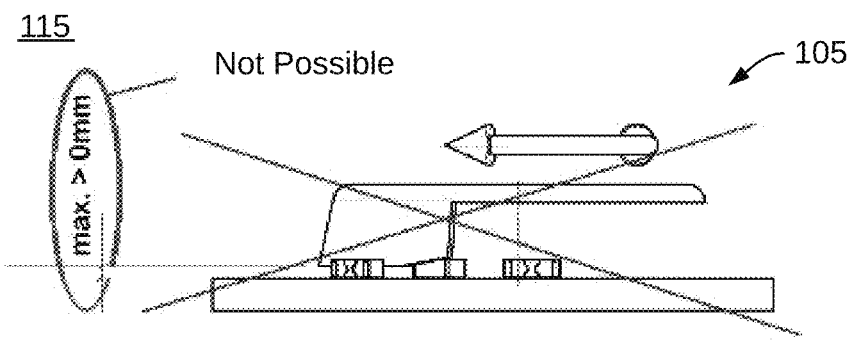

FIG. 3 illustrates a top view 113 of and a side view 115 of the sensor apparatus 100 without tilting. As discussed previously, the angular circuit board assembly 124 can maintain the circuit board 126 and the pulse disk 104 in an angular assembly that allows the pulse disc 104 to dive through the PCB. Without having the pulse disc 104 (also referred to as a pulse wheel) dive through PCB, sensor components would not be possible to be used in this arrangement. By dipping the pulse disc 104 as discussed herein, it is possible to use low-cost SMD components (e.g., LED/photodiodes) as shown in FIG. 1 and FIG. 2, for example.

The configuration shown in FIG. 3 illustrates a comparable function without tilting and immersion of the pulse disc 104 through the PCB, which is much more expensive and larger standard components would have to be used. This is why the side view 115 shown in FIG. 3 is depicted as crossed-out and indicated as "not possible". The tilting of the PCB and dipping of pulse disc 104 as discussed herein can provide for cost savings and low space consumption. This solution is estimated to save 0.53 USD per unit, which equals 265,000 USD per year with planned quantities of 500,000 units per year.

Figure 4:
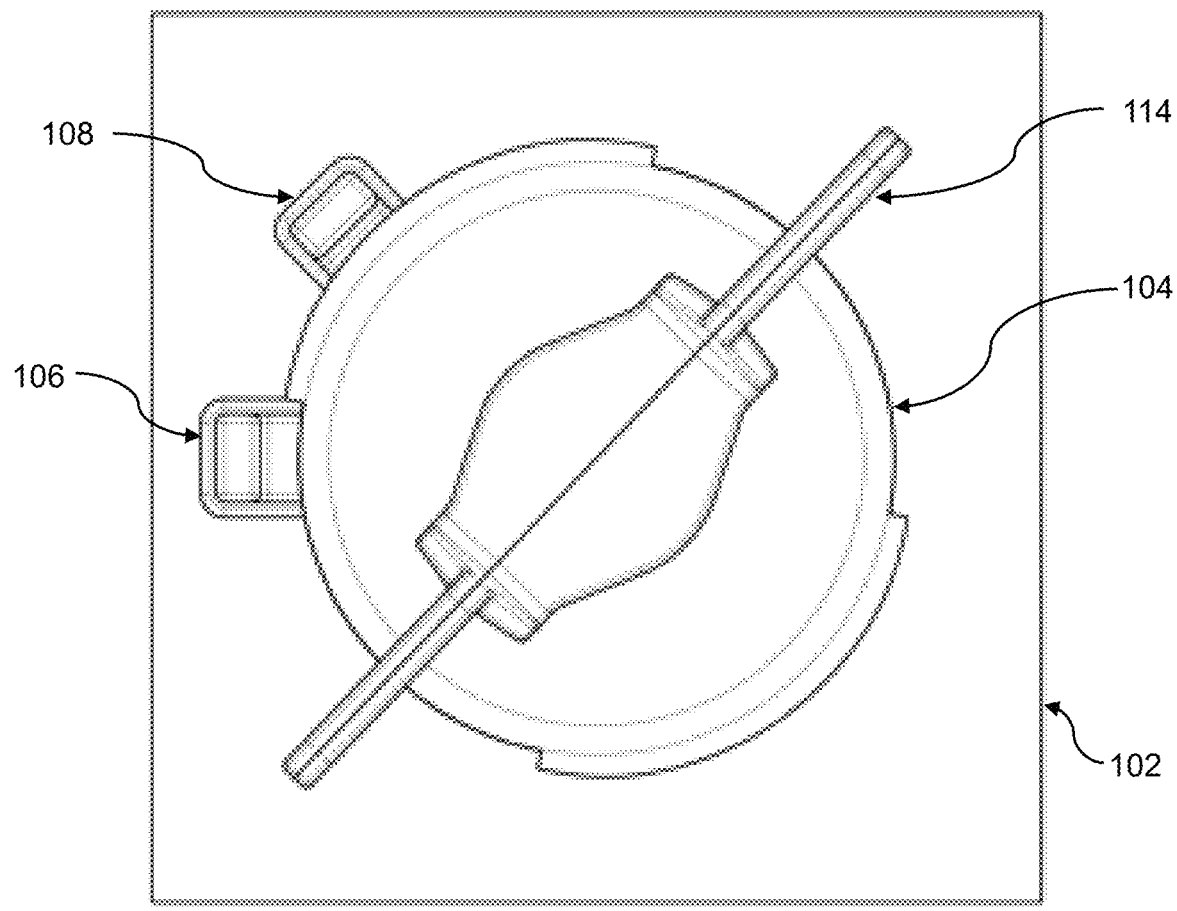
FIG. 4 illustrates a top perspective view of a portion of a flowmeter, in accordance with an embodiment.

FIG. 4 illustrates a top perspective view of a portion of the sensor apparatus 100, in accordance with an embodiment. As discussed previously, identical or similar reference numerals discussed and illustrated herein generally refer to the same or identical feature or component. FIG. 4 shows a cap mounted on or with respect to the pulse disc 104.

FIG. 5 illustrates a cut-away portion of a flowmeter apparatus 130 that can include the sensor apparatus 100 in an angular arrangement that allows the pulse disk 104 to dive through the circuit board 126, in accordance with an embodiment. As discussed previously, the flowmeter apparatus 130 may be implemented in the context of a flowmeter such as, for example, a bellows gas meter. The flowmeter apparatus 130 includes the sensor apparatus 100, which can include one or more sensors such as the sensors 106, 107, 108 (not shown in FIG. 5) as discussed previously, which can be associated with the pulse disc 104. The flowmeter apparatus 130 includes the angular circuit board assembly 124, which maintains the circuit board 126 in an angular position (see the angular gap 122 in FIG. 5) with respect to the pulse disk 104 of the sensor(s) in an arrangement that allows the pulse disk 104 to dive through the circuit board 126.

The angular sensor assembly of the flowmeter apparatus 130 allows for the usage of inexpensive sensor components such as SMD optical sensors/light barriers for the detection mechanical inducted signals, by allowing the mechanical device (e.g., the pulse disk 104) to dive into the plane of the circuit board 126. By assembling the PCB, for example, into a housing in an angular arrangement as shown in FIG. 5 and elsewhere herein, the usage of cheaper components is made possible. Without this special way of assembly, special sensor would be needed to pick up signals.

It should be appreciated that pulse disk 104 can be implemented in the context of different types of flowmeters. For example, the disclosed flowmeter apparatus 130 can be implemented as a paddle-wheel flowmeter and/or an impeller flowmeter with the oscillating disk 104 to provide fluid measurement. The rotating component (i.e., the disk 104) can be designed to provide a pulse when passing either a magnetic sensor and/or an optical sensor. The frequency of pulses is proportional to the velocity of the fluid at one point in the pipe or channel, and can offer a relatively high accuracy for their low cost.

It can be appreciated that the disclosed embodiments are not limited to gas measurement applications. That is, the disclosed embodiments can be used for the mechanical/electrical detection of pulses of a rotary motion. In addition, the embodiments include the inclined position of a circuit board (e.g., a PCB) provided with a slot in which a rotating pulse barrier can pass. This plunging through, makes it possible to equip a circuit board with very low-cost components to detect this rotation. This approach can be implemented wherever there is a rotational movement (not only in gas meters). This approach can be used to convert these recorded impulses into e.g. volumes, speeds, angles, etc.

Based on the foregoing, it can be appreciated that a number of embodiments, including preferred and alternative embodiments, are disclosed herein. In a preferred embodiment, a sensor apparatus can include at least one sensor and a printed circuit board, wherein the at least one sensor is associated with a rotatable component (e.g., pulse disk, crank, pin, shaft, etc.) and detects pulses of a rotary motion. The angular circuit board assembly can maintain the printed circuit board in an angular position with respect to the rotatable component associated with the at least one sensor in an arrangement that allows the rotatable component to dive through the printed circuit board and facilitate detection of the pulses of the rotatable component by the at least one sensor.

In an embodiment, the at least one sensor can comprise an optical sensor that detects mechanically inducted signals.

In an embodiment, the at least one sensor can comprise at least one of: a light emitting diode, a photo diode and a light barrier.

In an embodiment, the at least one sensor can comprise a magnetic sensor that detects mechanically inducted signals.

In an embodiment, the at least one sensor can include a flow channel and the rotatable component can oscillate to provide a measurement of a flow of fluid through the flow channel.

In an alternative embodiment, a flow meter apparatus can include a flowmeter comprising at least one sensor and a circuit board, wherein the at least one sensor is associated with a rotatable component, and an angular circuit board assembly can maintains the circuit board in an angular position with respect to the rotatable component associated with the at least one sensor in an arrangement in which the rotatable component can dive through the circuit board.

In another embodiment, a method of operating a sensor apparatus, can involve: detecting pulses or a rotary motion with at least one sensor and a printed circuit board, wherein the at least one sensor is associated with a rotatable component and the printed circuit board can be maintained by an angular circuit board assembly in an angular position with respect to the rotatable component associated with the at least one sensor in an arrangement in which the rotatable component can dive through the printed circuit board and facilitate the detecting of the pulses of the rotary motion by the at least one sensor.

It will be appreciated that variations of the above-disclosed embodiments and examples and other features and functions, or alternatives thereof, may be desirably combined into many other different systems or applications. It will also be appreciated that various presently unforeseen or unanticipated alternatives, modifications, variations or improvements therein may be subsequently made by those skilled in the art which are also intended to be encompassed by the following claims.

What is claimed is:

1. A sensor apparatus, comprising:
   at least one sensor and a printed circuit board, wherein the at least one sensor is associated with a rotatable component, wherein the at least one sensor is detects configured for at least one of mechanical detection of pulses of associated to a rotary motion or electrical detection of the pulses associated to the rotary motion caused by the rotatable component; and an angular circuit board assembly that maintains the printed circuit board in an angular position with respect to the rotatable component associated with the at least one sensor in an arrangement that allows the rotatable component to dive through the printed circuit board and facilitate detection of the pulses of the rotary motion by the at least one sensor, wherein the printed circuit board in the angular position maintains an angular gap with respect to the rotatable component, wherein the at least one sensor includes a flow channel and wherein the rotatable component oscillates to provide a measurement of a flow of fluid through the flow channel.

2. The sensor apparatus of claim 1 wherein the at least one sensor comprises an optical sensor that detects mechanically inducted signals.

3. The sensor apparatus of claim 2 wherein the at least one sensor comprises at least one of: a light emitting diode, a photo diode and a light barrier.

4. The sensor apparatus of claim 1 wherein the at least one sensor comprises a magnetic sensor that detects mechanically inducted signals.

5. A flowmeter apparatus, comprising: a flowmeter comprising at least one sensor and a circuit board, wherein the at least one sensor is associated with a rotatable component, wherein the at least one sensor configured for at least one of mechanical detection of pulses associated to a rotary motion or electrical detection of the pulses associated to the rotary motion caused by the rotatable component; and an angular circuit board assembly that maintains the circuit board in an angular position with respect to the rotatable component associated with the at least one sensor in an arrangement that allows the rotatable component to dive through the circuit board, wherein the circuit board in the angular position maintains an angular gap with respect to the rotatable component, wherein the at least one sensor includes a flow channel and wherein the rotatable component oscillates to provide a measurement of a flow of fluid through the flow channel.

6. The flowmeter apparatus of claim 5 wherein the circuit board comprises a printed circuit board.

7. The flowmeter apparatus of claim 5 wherein the at least one sensor comprises an optical sensor that detects mechanically inducted signals.

8. The flowmeter apparatus of claim 7 wherein the at least one sensor comprises at least one of: a light emitting diode, a photo diode and a light barrier.

9. The flowmeter apparatus of claim 5 wherein the at least one sensor comprises a magnetic sensor that detects mechanically inducted signals.

10. The flowmeter apparatus of claim 5 wherein the rotatable component comprises at least one of: a pulse disk, a crank, a shaft or a pin.

11. The flowmeter apparatus of claim 5 wherein the flowmeter comprises a bellows gas meter.

12. A method of operating a sensor apparatus, comprising:
detecting pulses or a rotary motion with at least one sensor and a printed circuit board, wherein the at least one sensor is associated with a rotatable component and the printed circuit board is maintained by an angular circuit board assembly in an angular position with respect to the rotatable component associated with the at least one sensor in an arrangement in which the rotatable component dives through the printed circuit board and facilitates mechanical detection of pulses associated to the rotary motion or electrical detection of the pulses associated to the rotary motion by the at least one sensor, wherein the at least one sensor includes a flow channel and wherein the rotatable component oscillates to provide a measurement of a flow of fluid through the flow channel; and wherein the printed circuit board in the angular position maintains an angular gap with respect to the rotatable component.

13. The method of claim 12 wherein the at least one sensor comprises an optical sensor that detects mechanically inducted signals.

14. The method of claim 13 wherein the at least one sensor comprises at least one of: a light emitting diode, a photo diode and a light barrier.

15. The method of claim 12 wherein the at least one sensor comprises a magnetic sensor that detects mechanically inducted signals.

16. The method of claim 13 wherein the rotatable component comprises at least one of: a pulse disk, a crank, a shaft or a pin.

17. The method of claim 13 further comprising operating a flowmeter that includes the at least one sensor, the printed circuit board, and the rotatable component associated with the at least one sensor.

* * * * *